(12) United States Patent
Kim

(10) Patent No.: US 12,386,148 B1
(45) Date of Patent: Aug. 12, 2025

(54) MIRROR ASSEMBLY

(71) Applicant: LG ELECTRONICS INC., Seoul (KR)

(72) Inventor: Keumhwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/111,916

(22) PCT Filed: Sep. 20, 2023

(86) PCT No.: PCT/KR2023/014235
§ 371 (c)(1),
(2) Date: Mar. 14, 2025

(87) PCT Pub. No.: WO2025/063333
PCT Pub. Date: Mar. 27, 2025

(51) Int. Cl.
*G02B 7/182* (2021.01)
*B60R 1/04* (2006.01)

(52) U.S. Cl.
CPC .............. *G02B 7/182* (2013.01); *B60R 1/04* (2013.01)

(58) Field of Classification Search
CPC .................................. B60R 1/04; G02B 7/182
USPC ........................................... 359/872; 248/549
See application file for complete search history.

(56) References Cited

U.S. PATENT DOCUMENTS

| | | | |
|---|---|---|---|
| 3,421,728 A * | 1/1969 | Gordon | B60R 1/04 248/487 |
| 4,679,906 A | 7/1987 | Brandenburg | |
| 5,582,383 A | 12/1996 | Mertens et al. | |
| 10,029,615 B2 | 7/2018 | Hallack | |
| 10,800,335 B2 | 10/2020 | Hallack et al. | |

(Continued)

FOREIGN PATENT DOCUMENTS

| EP | 3 056 387 B1 | 4/2018 |
|---|---|---|
| KR | 10-1998-0045882 A | 9/1998 |

(Continued)

OTHER PUBLICATIONS

International Search Report (PCT/ISA/210) issued in PCT/KR2023/014235, dated Jun. 21, 2024.

(Continued)

*Primary Examiner* — Ricky D Shafer
(74) *Attorney, Agent, or Firm* — Birch, Stewart, Kolasch & Birch, LLP

(57) ABSTRACT

A mirror assembly according to the present embodiment comprises a housing; a support bracket rotatably disposed on the housing and coupled to a mirror; and a cam module mounted on the support bracket and tilting the support bracket relative to the housing, and the cam module may comprise a cover guide mounted on the support bracket and having a space formed in the cover guide; an inner body accommodated in the space and having a mountain and a valley formed on an upper surface of the inner body; a shaft penetrating the inner body; a handle connected to a lower portion of the shaft; a cam connected to an upper portion of the shaft, having a mountain and a valley formed on a lower surface of the cam, and contacting the housing; and an elastic member accommodated in the space and pressing the inner body in the direction of the cam.

10 Claims, 9 Drawing Sheets

(56) References Cited

U.S. PATENT DOCUMENTS

| | | | |
|---|---|---|---|
| 2005/0078389 A1* | 4/2005 | Kulas | B60R 1/04 359/877 |
| 2011/0242667 A1 | 10/2011 | Kulas et al. | |
| 2016/0129842 A1* | 5/2016 | Kuester | B60K 35/53 359/872 |
| 2016/0185298 A1 | 6/2016 | Skiver et al. | |
| 2016/0236620 A1 | 8/2016 | Gómez Timoneda et al. | |
| 2018/0118115 A1* | 5/2018 | Kuester | B60R 1/04 |
| 2018/0186293 A1* | 7/2018 | Fish, Jr. | B60R 1/12 |
| 2019/0118713 A1 | 4/2019 | Steffes | |
| 2021/0323477 A1* | 10/2021 | LaCross | B60R 1/04 |

FOREIGN PATENT DOCUMENTS

| | | |
|---|---|---|
| KR | 20-0249372 Y1 | 11/2001 |
| KR | 10-2019-0077355 A | 7/2019 |

OTHER PUBLICATIONS

Korean Office Action for application No. 10-2024-7026935 mailed Dec. 5, 2024.
Written Opinion (PCT/ISA/237) issued in PCT/KR2023/014235, dated Jun. 21, 2024.

* cited by examiner

[FIG. 1]
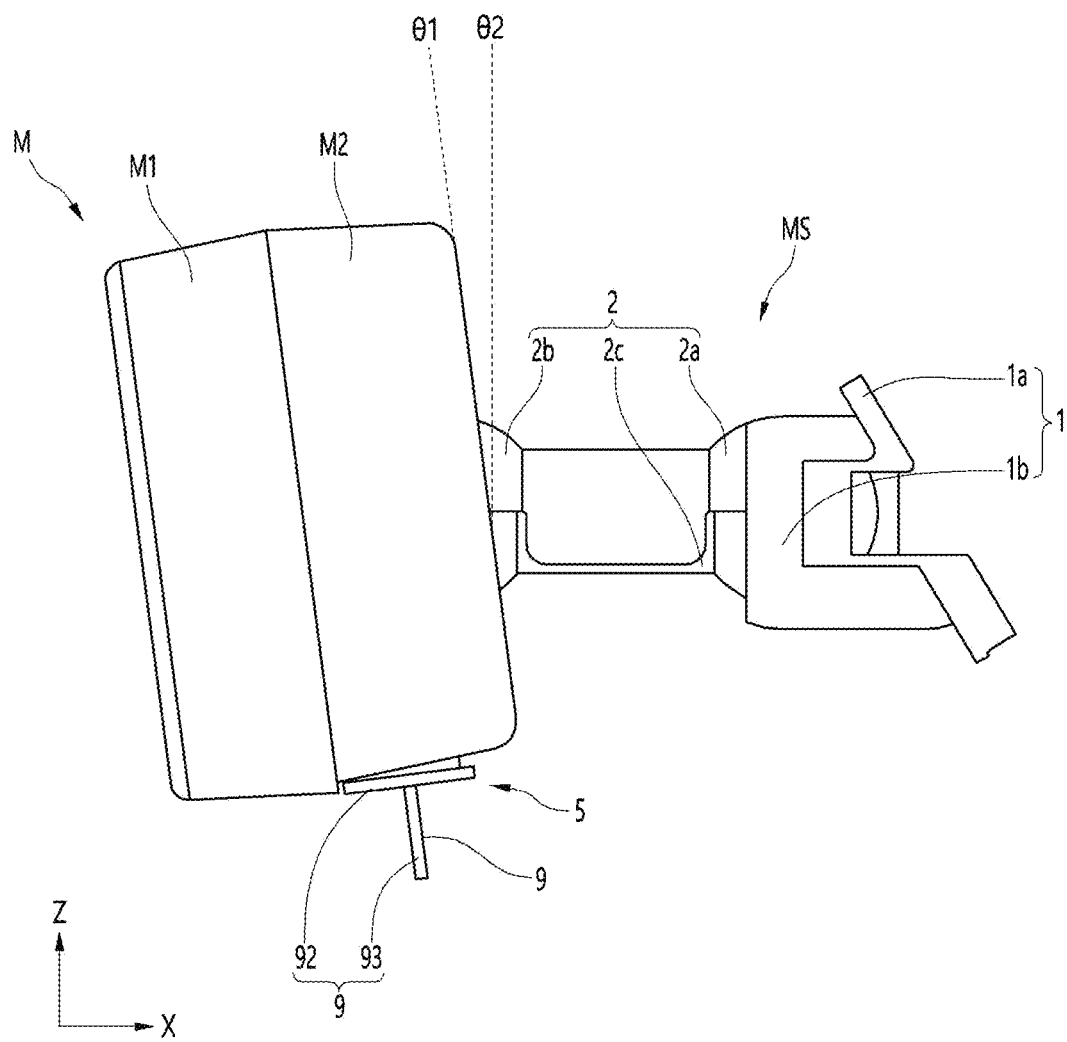

[FIG. 2]
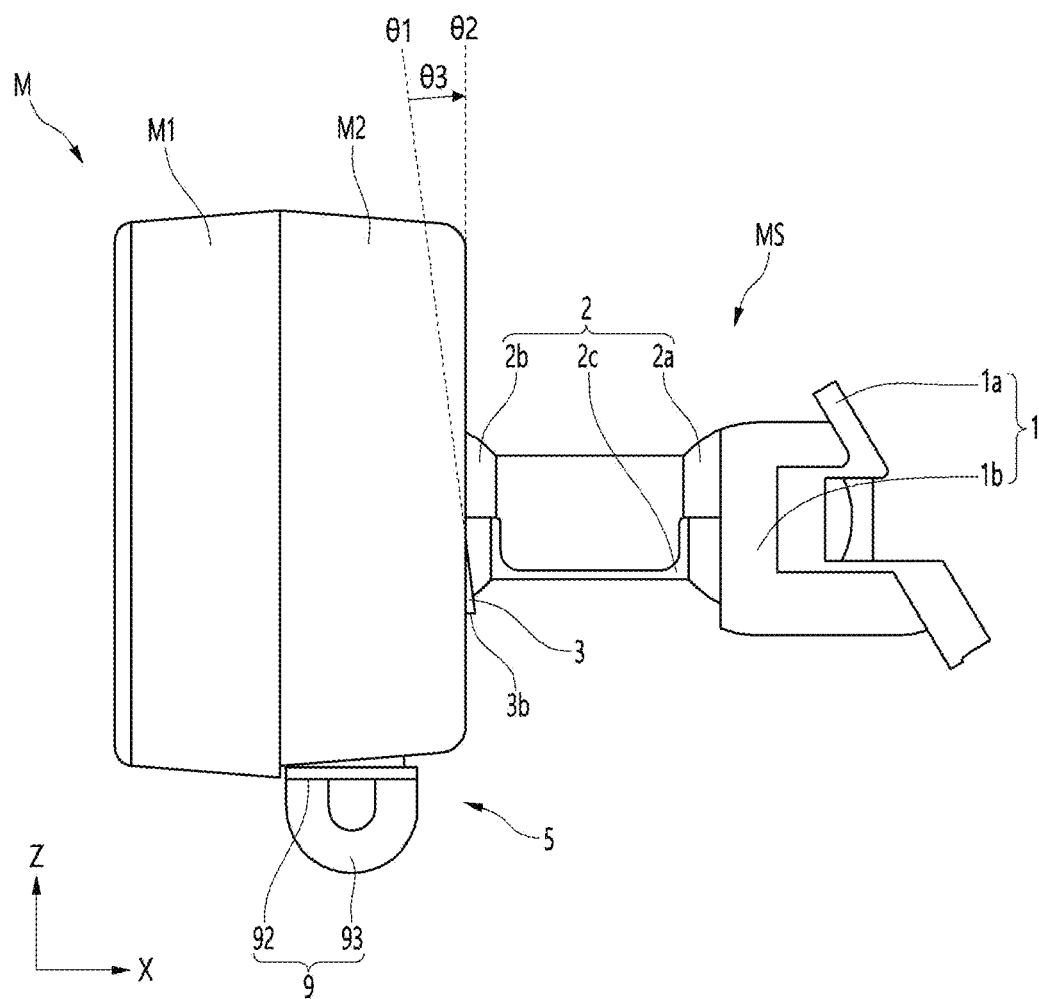

[FIG. 3]
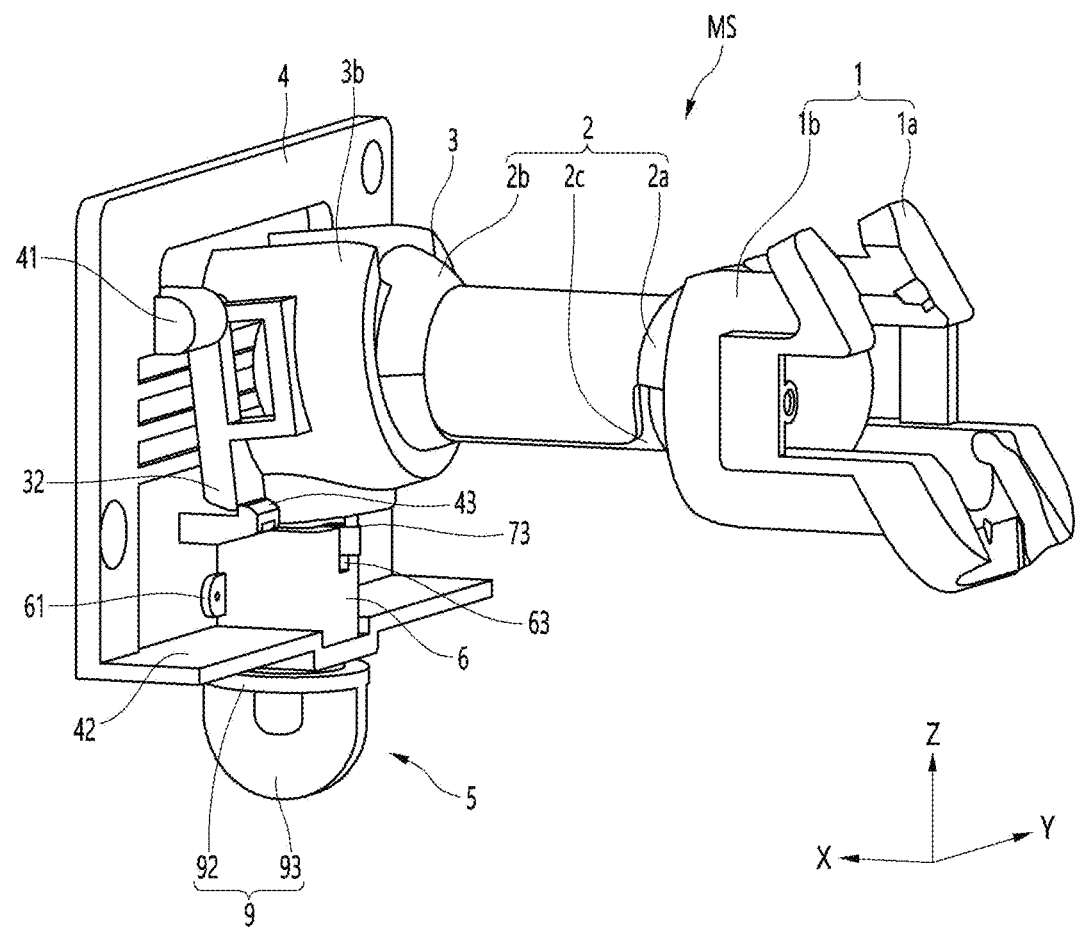

[FIG. 4]
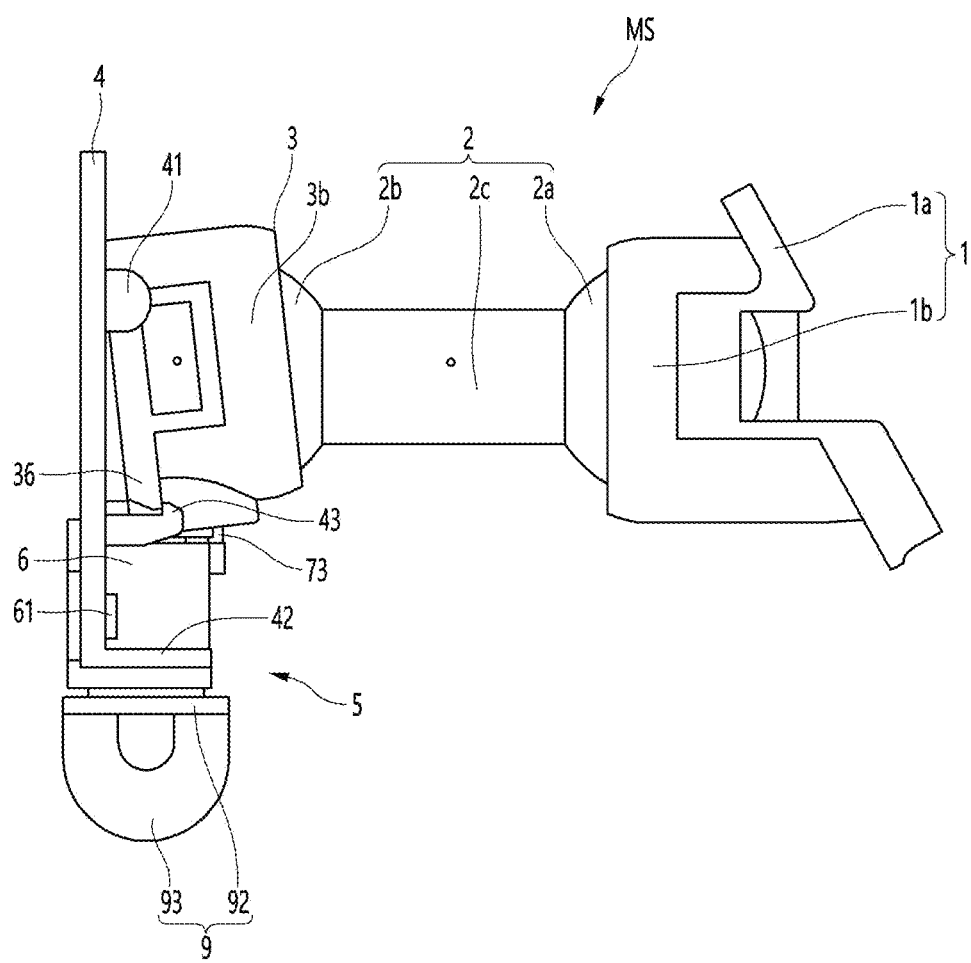

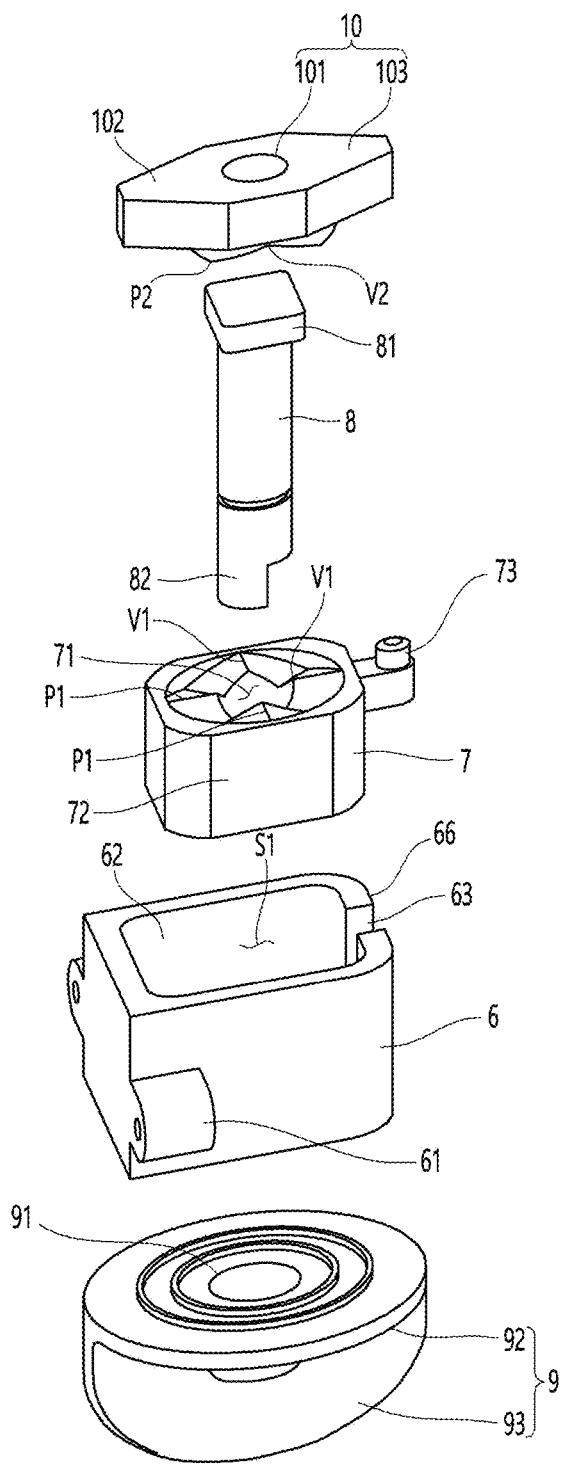
[FIG. 5]

[FIG. 6]
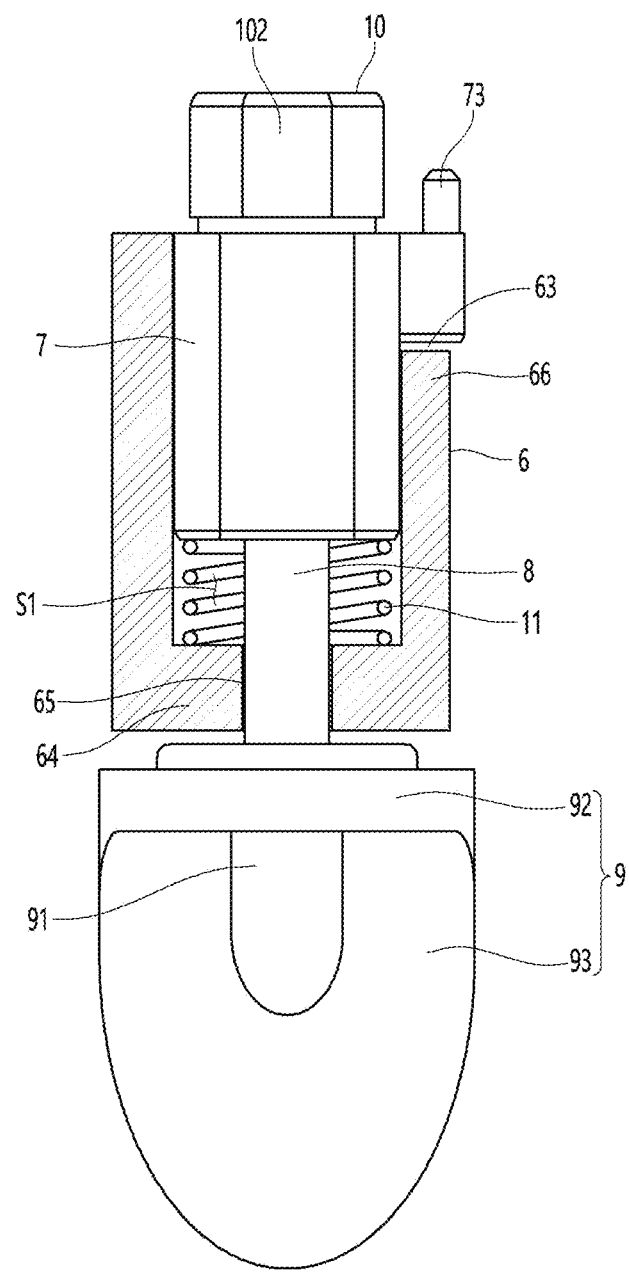

【FIG. 7】
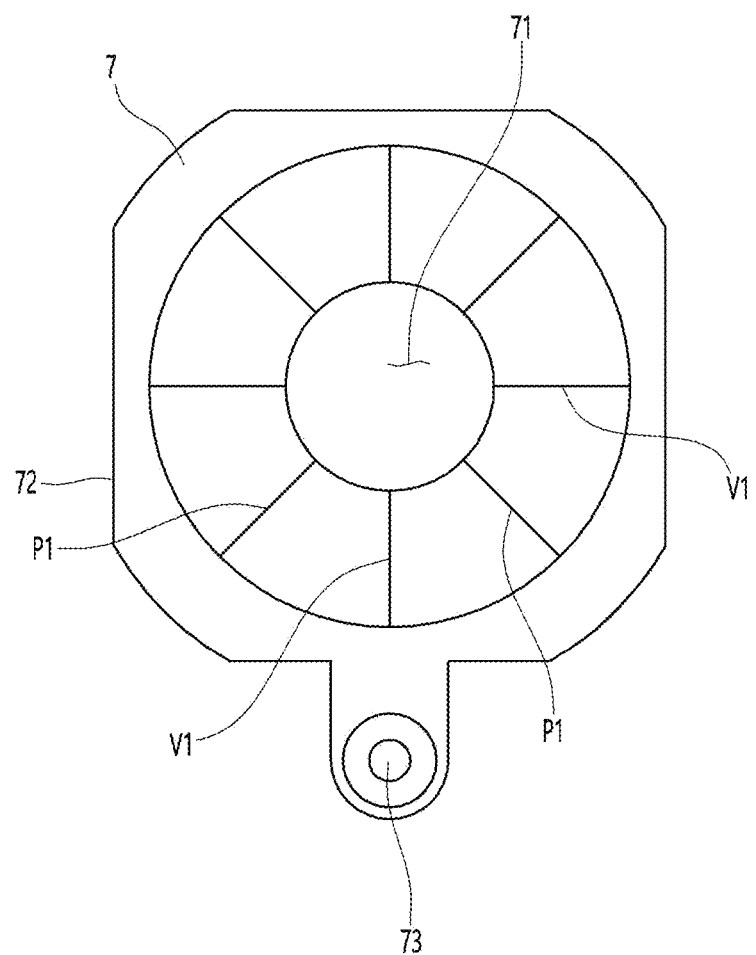

[FIG. 8]
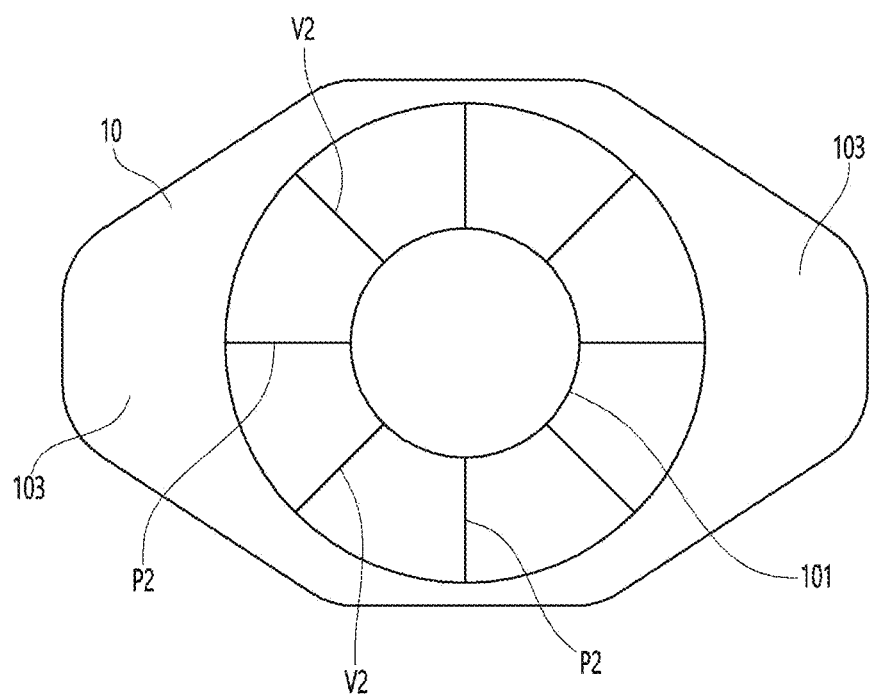
[FIG. 9]
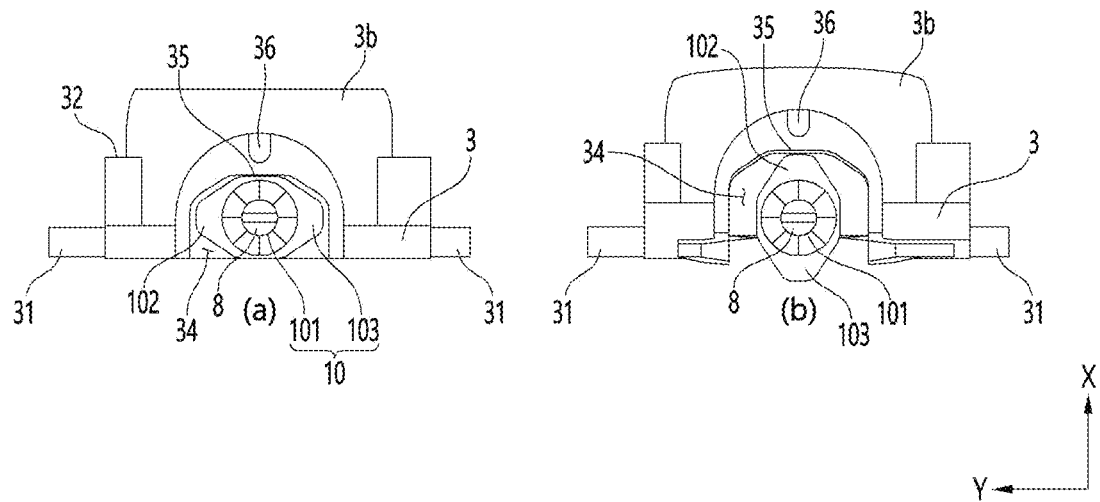

[FIG. 10]
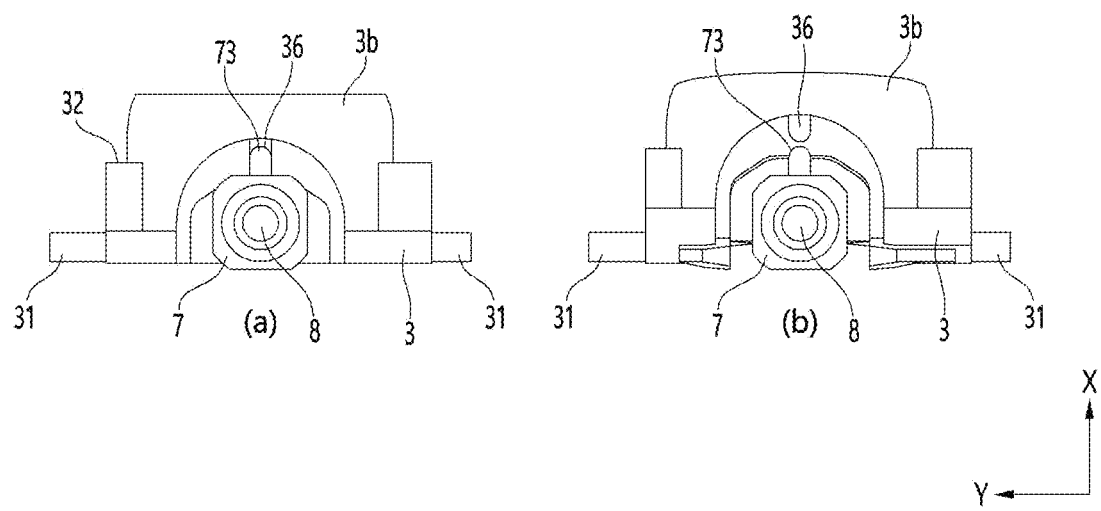

MIRROR ASSEMBLY

CROSS REFERENCE TO RELATED APPLICATIONS

This application is the National Phase of PCT International Application No. PCT/KR2023/014235, filed on Sep. 20, 2023, which is hereby expressly incorporated by reference into the present application.

TECHNICAL FIELD

The present invention relates to a mirror assembly installed in a vehicle, etc.

BACKGROUND ART

An example of the mirror assembly may comprise a room mirror and a room mirror support that can be fixed to a glass or roof panel of a vehicle, and the angle of the room mirror may be adjustable.

An example of an angle-adjustable room mirror is a rear view assembly disclosed in U.S. Patent Publication No. U.S. Pat. No. 10,800,335 B2 (Oct. 13, 2020, published), which comprises a display mirror assembly and an actuator assembly comprising a toggle switch operably connected to the display mirror assembly to tilt a glass element.

DISCLOSURE

Technical Problem

The present embodiment provides a mirror assembly capable of tilting a mirror with a simple motion of turning a handle.

The present embodiment provides a mirror assembly capable of tilting a mirror regardless of the direction in which the handle is turned.

Technical Solution

A mirror assembly according to the present embodiment comprise a housing; a support bracket rotatably disposed on the housing and coupled to a mirror; and a cam module mounted on the support bracket and tilting the support bracket relative to the housing, and the cam module may comprise a cover guide mounted on the support bracket and having a space formed in the cover guide; an inner body accommodated in the space and having a mountain and a valley formed on an upper surface of the inner body; a shaft penetrating the inner body; a handle connected to a lower portion of the shaft; a cam connected to an upper portion of the shaft, having a mountain and a valley formed on a lower surface of the cam, and contacting the housing; and an elastic member accommodated in the space and pressing the inner body in the direction of the cam.

The mirror assembly may further comprise a housing glass; and a ball shaft supported by the housing glass, The housing may comprise a ball receiving portion in which a ball of the ball shaft is inserted and received, the ball receiving portion is supported by the ball.

A locking hook caught in the housing may protrude on the support bracket, when the support bracket is tilted at a set angle.

A locking portion may be formed on the housing.

A locking projection that is inserted into and caught by the locking portion may be formed on the inner body.

An avoidance groove that avoids the locking projection may be formed on the cover guide.

When the support bracket is at a reference angle, the locking projection is inserted into the locking portion, and when the support bracket is tilted at the reference angle, the locking projection may be pulled out from the locking portion.

An inner surface of the cover guide and an outer surface of the inner body may be polygonal.

The handle may comprise a shaft connection portion to which the lower portion of the shaft is connected; a horizontal body facing a bottom surface of the mirror; and a vertical body orthogonal to the horizontal body.

The cam may comprise a shaft connection portion to which the shaft is connected; and a pair of cam noses formed symmetrically with the shaft connection portion interposed between the pair of cam noses.

The mirror assembly may further comprise a restoration spring disposed between one surface of the support bracket and one surface of the housing.

Advantageous Effect

According to this embodiment, the support bracket can be tilted or restored based on the housing with a simple motion of turning the handle, so that the user can easily tilt the mirror.

In addition, the elastic member can limit the rapid lifting and lowering of the inner body when the handle is rotated, and can function as a damper.

In addition, the support bracket can be tilted or restored regardless of the direction in which the handle is turned, so that the convenience of use can be increased.

In addition, the driver can easily recognize whether the mirror is currently tilted by looking at the disposition angle of the vertical body of the handle.

DESCRIPTION OF DRAWINGS

FIG. 1 is a side view of a mirror assembly according to the present embodiment,

FIG. 2 is a side view when the handle illustrated in FIG. 1 is rotated 90°,

FIG. 3 is a perspective view of the mirror assembly when the mirror illustrated in FIG. 2 is separated, FIG. 4 is a side view of the mirror assembly when the mirror illustrated in FIG. 2 is separated, FIG. 5 is an exploded perspective view of a cam module according to the present embodiment, FIG. 6 is a side view when a portion of a cover guide according to the present embodiment is cut off, FIG. 7 is a plan view of an inner body according to the present embodiment, FIG. 8 is a bottom view of a cam according to the present embodiment, FIG. 9 is a bottom view showing a housing and a cam according to the present embodiment, FIG. 10 is a bottom view showing a housing and an inner body according to the present embodiment.

BEST MODE

Hereinafter, specific embodiments of the present invention will be described in detail with reference to the drawings.

FIG. 1 is a side view of a mirror assembly according to the present embodiment, and FIG. 2 is a side view when the handle illustrated in FIG. 1 is rotated 90°.

A mirror assembly may be installed in a vehicle to provide a rear view to a driver. An example of the mirror assembly may be a device for protecting the driver's eyes from the lights of a following vehicle when driving at night. An example of the mirror assembly may comprise an ECM room mirror.

The mirror assembly may comprise a mirror M and a mirror support MS that supports the mirror M.

The mirror M may comprise an outer housing and a display panel (not shown) disposed in the outer housing.

The outer housing may comprise a first housing M1 and a second housing M2.

The first housing M2 may be a housing facing the driver and may be a front housing based on the driver, and a rear opening may be formed on the rear surface of the first housing M2 through which a user may view the display panel (not shown).

The second housing M2 may be a housing disposed in front of the first housing M2 and may be a rear housing based on the driver. A front opening through which the housing 3 penetrates may be formed on the front of the second housing M2.

The display panel may be disposed inside the outer housing M1 and M2 and may provide a screen to the rear through the rear opening.

An example of the display panel may be a display element that may provide various information of the vehicle, such as an LCD or OLED.

The mirror M may further comprise a bracket (or supporter) disposed inside the outer housing M1 and M2.

The mirror assembly may comprise a housing glass 1, a ball shaft 2 supported by the housing glass 1, a housing 3, a support bracket 4, shown in FIGS. 3 and 4, and a cam module 5.

The housing glass 1 may be attached to a glass or panel of the vehicle.

The housing glass 1 may comprise a glass attachment body 1a attached to the glass or panel.

A ball shaft 2 may be connected to the housing glass 1. A front ball receiving portion 1b may be formed in the housing glass 1 into which a front ball 2a of the ball shaft 2 may be inserted and received.

The ball shaft 2 may be supported by the housing glass 1.

The ball shaft 2 may be connected to a pair of balls 2a and 2b by a shaft 2c. The pair of balls 2a and 2b and the shaft 2a may be formed integrally.

The pair of balls 2a and 2b may be spaced apart with the shaft 2c interposed therebetween. The pair of balls 2a and 2b may be formed at a longitudinal end of the shaft 2c. A pair of balls 2a and 2b may be spaced apart in the front and rear direction X. Each of the pair of balls 2a and 2b may have an overall spherical shape or a shape close to a spherical shape. The outer circumferential surface of each of the pair of balls 2a and 2b may be curved.

A pair of balls 2a and 2b may comprise a front ball 2a and a rear ball 2b.

The front ball 2a may be inserted into the front ball receiving portion 1b and supported.

The rear ball 2b may be inserted into the ball receiving portion 3b (rear ball receiving portion) formed in the housing 3 and may support the housing 3.

A shaft 2c may be formed between the front ball 2a and the rear ball 2b.

The shaft 2c may have a straight shape or a bent shape.

The mirror support MS may comprise a housing 3, a support bracket 4, shown in FIGS. 3 and 4, and a cam module 5, and the housing 3, the support bracket 4, and the cam module 5 may tiltably support the mirror M.

The housing 3 may be a housing mirror that is closer to the mirror M among the mirror M and the glass.

The housing 3 may comprise a ball receiving portion 3b supported by a ball 2b of a ball shaft 2, and the rear ball 2b of the ball shaft 2 may be inserted into the ball receiving portion 3b and received in the ball receiving portion 3b.

The support bracket 4 may be coupled with the mirror M, and may be tilted or restored together with the mirror M.

The cam module 5 may comprise a handle 9.

The handle 9 may be disposed to be rotatable about a vertical axis on the lower side of the mirror M.

The handle 9 may be rotated clockwise or counterclockwise about the shaft.

The handle 9 may comprise a horizontal body 92 facing the bottom of the mirror M and a vertical body 93 orthogonal to the horizontal body 92.

The vertical body 93 may be long in the left and right direction Y and short in the front and rear direction X, as shown in FIG. 1, or may be short in the left and right direction Y and long in the front and rear direction X, as shown in FIG. 2.

When the driver holds and rotates the vertical body 93 of the handle 9, the cam module 5 may cause the mirror M to tilt by a set angle 63 about a reference angle 61 and a tilting angle 82, as shown in FIG. 2.

The driver may easily recognize whether the mirror M is at the current tilt angle 62 or the reference angle 61 through the disposition angle of the vertical body 93.

Hereinafter, the cam module 5 is described in FIGS. 3 to 6.

FIG. 3 is a perspective view of the mirror assembly when the mirror illustrated in FIG. 2 is separated, FIG. 4 is a side view of the mirror assembly when the mirror illustrated in FIG. 2 is separated, FIG. 5 is an exploded perspective view of a cam module according to the present embodiment, FIG. 6 is a side view when a portion of a cover guide according to the present embodiment is cut off, FIG. 7 is a plan view of an inner body according to the present embodiment, and FIG. 8 is a bottom view of a cam according to the present embodiment.

The mirror assembly may comprise a housing 3, a support bracket 4, and a cam module 5.

The housing 3 may be provided with a hinge axis 31, shown in FIGS. 9 and 10.

The hinge axis 31 may be a center of rotation of the support bracket 4. The hinge axis 31 may be formed on both sides of the housing 3. The hinge axis 31 may be disposed approximately horizontally. The hinge axis 31 may be elongated in the left and right direction Y.

The housing 3 may be formed with a hook portion 32 on which a locking hook 43 of the support bracket 4 is caught.

The hook portion 32 may be spaced apart from the locking hook 43 in the front and rear direction X when the support bracket 4 is at a reference angle θ1, and as shown in FIG. 3, when the support bracket 4 is tilted at a tilting angle θ2, the locking hook 43 may be restrained.

The support bracket 4 may be rotatably disposed in the housing 3.

The support bracket 4 may be formed with a hinge axis receiving portion 41 that is rotatably supported by the hinge axis 31.

The hinge axis receiving portion 41 may correspond 1:1 with the hinge axis 31. A pair of hinge shaft receiving portions 41 may be provided, and a pair of hinge shaft receiving portions 41 may comprise a left hinge shaft receiving portion that is rotatably supported by a hinge shaft 31 formed on the left side of the housing 3, and a right hinge shaft receiving portion that is rotatably supported by a hinge shaft 31 formed on the right side of the housing 3.

The hinge shaft receiving portion 41 may protrude from the upper portion of the front surface of the support bracket 4 based on the vehicle driving direction.

The support bracket 4 may be tilted at a tilting angle θ2 or restored to a reference angle θ1 around the hinge shaft 31.

The support bracket 4 may be coupled to the mirror M. The support bracket 4 may be fastened to a display panel or bracket (or supporter) disposed on the mirror M.

The support bracket 4 may be tilted or restored together with the mirror M.

The support bracket 4 may be tilted based on the housing 3 by the cam module 5.

The support bracket 4 may comprise a lower bracket 42 on which the cover guide 6 may be seated and supported.

The lower bracket 42 may be protruded in a front and rear direction Z. The lower bracket 42 may be protruded in a forward direction.

The support bracket 4 may have a locking hook 43 that is hooked to the housing 3 when the support bracket 4 is tilted at a set angle.

The locking hook 43 may be protruded on the front surface of the support bracket 4.

The locking hook 43 may comprise a protruding body protruding on the front surface of the support bracket 4 and a hook body protruding upward from the front end of the protruding body.

The hook body may be spaced apart from the hook portion 32 in the front and rear direction X, or may be caught by coming into contact with the hook portion 32.

The hook body may be caught on the hook portion 32 when the support bracket 4 is at a tilting angle θ2.

If the support bracket 4 is tilted by a set angle as shown in FIG. 3, the locking hook 43 of the support bracket 4 is caught on the hook portion 32 of the housing 3, and the support bracket 4 does not over-tilt beyond the set angle (e.g., 7°).

The tilting angle 62 of the support bracket 4 may be limited by the locking hook 43 and the hook portion 32.

The cam module 5 may be mounted on the support bracket 4. The cam module 5 may tilt the support bracket 4 relative to the housing 3.

The cam module 5 may be a combination of multiple members.

The cam module 5 may comprise a cover guide 6, an inner body 7, a shaft 8, a handle 9; and a cam 10, and the support bracket 4 may tilt relative to the housing 3 if the cam 10 presses the housing 3.

The cover guide 6 may be mounted on the support bracket 4. The cover guide 6 may be seated on the lower bracket 42 of the support bracket 4.

A space S1 may be formed inside the cover guide 6, as shown in FIGS. 5 and 6. The upper surface of the cover guide 6 may be open.

The cover guide 6 may be disposed on the front surface of the support bracket 4. The cover guide 6 may be fastened to the support bracket 4 with a fastening member such as a screw. The cover guide 6 may be formed with a fastening portion 61 through which the fastening member penetrates, and the fastening member may be fastened to the support bracket 4 by penetrating the fastening portion 61.

The cover guide 6 may cover the inner body 7.

The inner surface 62 of the cover guide 6 may be polygonal and may restrict the inner body 7 from rotating.

The cover guide 6 may be formed with an avoidance groove 63 to avoid the locking protrusion 73 of the inner body 7 described later.

The avoidance groove 63 may be formed to be sunken downward at the upper end of the front plate 66 of the cover guide 6, as illustrated in FIG. 6.

The cover guide 6 may comprise a lower plate 64, as illustrated in FIG. 6. A shaft penetration hole 65 may be formed on the lower plate 64 through which the shaft 8 passes.

The inner body 7 may be inserted into the space S1 and accommodated in the space S1.

The inner body 7 may be raised and lowered in the space S1.

The inner body 7 may have a shaft penetration hole 71 formed in the inner body 7 through which the shaft 8 passes. The shaft penetration hole 71 may be opened in the up and down direction Z.

The outer surface 72 of the inner body 7 may be polygonal. The outer surface 72 of the inner body 7 may be conformed to the inner surface 62 of the cover guide 6. When the shaft 8 rotates, the inner body 7 may not rotate in the space S1 of the cover guide 6.

A mountain P1 and a valley V1 may be formed on the upper surface of the inner body 7.

The mountain P1 of the inner body 7 may be inserted into the valley V2 of the cam 10, and the mountain P2 of the cam 10 may be inserted into the valley V1 of the inner body 7.

If the mountain P1 of the inner body 7 is inserted into the valley V2 of the cam 10, and the mountain P2 of the cam 10 is inserted into the valley V1 of the inner body 7, the cam 10 may be restrained to the inner body 7, and the cam 10 may be seated on the inner body 7, and arbitrary rotation may be restricted.

The mountain P1 and the valley V1 may be alternately formed in a circumferential direction around the shaft through hole 71. The pitch of each of the peak P1 and the valley V1 may be 90°.

The inner body 7 may be lowered by the cam 10 and raised by the elastic member 11 described later.

If the cam 10 rotates, the peak P2 of the cam 10 may rise from the valley V1 of the inner body 7 to the peak P1 of the inner body 7, and the inner body 7 may be lowered while being supported by the elastic member 11, and the cam 10 and the inner body 7 may be maintained in contact.

The mountain P2 of the cam 10 may go down from the mountain P1 of the inner body 7 toward the valley V1 of the inner body 7, and the inner body 7 may be raised by the restoring force of the elastic member 11, and the cam 10 and the inner body 7 may be maintained in a contact state.

A locking projection 73 that is inserted and caught in the housing 3 may be formed in the inner body 7.

When the support bracket 4 is at a reference angle 81, the locking projection 73 may be inserted into the housing 3 and caught in the housing 3, and the inner body 7 may be locked to the housing 3.

If the support bracket 4 is tilted at the reference angle 81, the locking projection 7 may be pulled out from the housing 3, and the inner body 7 may be unlocked from the housing 3.

The shaft 8 may penetrate the inner body 7.

The upper portion 81 of the shaft 8 may be inserted into the cam 10 and connected to the cam 10.

The shaft 8 may penetrate the shaft through hole 71 of the inner body 7. The shaft 8 may penetrate the cover guide 6. The shaft 8 may penetrate the shaft through hole of the cover guide 8.

The lower portion 82 of the shaft 8 may be inserted into the handle 9 and connected to the handle 9.

The handle 9 may be connected to the lower portion of the shaft 8. The handle 9 may comprise a shaft connection portion 91 into which the lower portion of the shaft 8 is inserted, a horizontal body 92 facing the bottom surface of the mirror M, and a vertical body 93 orthogonal to the horizontal body 92.

The shaft connection 91 may be formed in the horizontal body 93.

The shaft connection 91 may be formed on the upper portion of the vertical body 93.

The cam 10 may be connected to the upper portion of the shaft 8.

A mountain P2 and a valley V2 may be formed on the lower surface of the cam 10.

The cam 10 may be in contact with the housing 3 and may pressurize the housing 3.

The cam 10 may comprise a shaft connection portion 101 and a pair of cam noses 102 and 103.

The shaft 8 may be connected to the shaft connection portion 101. The shaft connection portion 101 may be a hollow portion formed in the center of the cam 10.

The mountain P2 and the valley V2 of the cam 10 may be formed alternately in the circumferential direction around the shaft connection portion 101. The pitch of each of the mountain P2 and the valley V2 may be 90°.

A pair of cam noses 102 and 103 may be formed symmetrically with the shaft connection portion 101 in the pair of cam noses 102 and 103.

The cam module 5 may further comprise an elastic member 11.

The elastic member 11 may be mounted on the cover guide 6. The elastic member 11 may be mounted on the upper surface of the lower plate 64 of the cover guide 6, as shown in FIG. 6. The elastic member 11 may be inserted and accommodated in the space S1 of the cover guide 6 and may be protected by the cover guide 6.

An example of the elastic member 11 may be a spring.

The elastic member 11 may be disposed between the lower plate 64 of the cover guide 6 and the bottom surface of the inner body 7, and may support the inner body 7.

The elastic member 11 may limit a rapid rise or fall of the inner body 7 when the handle 9 is rotated, and may function as a damper.

The elastic member 11 may press the inner body 7 in the direction of the cam 10.

The mirror assembly may further comprise a restoration spring (not shown) disposed between one surface of the support bracket 4 and one surface of the housing 4.

The restoration spring may be disposed between the front surface of the support bracket 4 and the rear surface of the housing 4.

The restoration spring may be disposed between the upper portion of the front surface of the support bracket 4 and the upper portion of the rear surface of the housing 4, and may limit arbitrary rotation of the support bracket 4.

FIG. 9 is a bottom view showing a housing and a cam according to the present embodiment.

FIG. 9 (a) is a bottom view when the support bracket is at a reference angle 81, and FIG. 9 (b) is a bottom view when the support bracket is tilted at a set angle from the reference angle 81.

A cam receiving groove 34 may be formed on the bottom surface of the housing 3 in which a cam 10 is rotatably received.

The width of the cam receiving groove 34 in the left and right direction Y may be longer than the length of the cam receiving groove 65 in the front and rear direction X.

A cam nose contact portion 35 may be formed on the housing 3 in which the cam noses 102 and 103 of the cam 10 come into contact.

If the cam 10 is disposed long in the left and right direction Y as shown in FIG. 9 (a), a pair of cam noses 102 and 103 may be spaced apart from the cam nose contact portion 35.

When the handle 9 is rotated 90°, the shaft 8 may rotate the cam 10 90°, and the cam 10 may be disposed long in the front and rear direction X, as shown in FIG. 9 (b). If the cam 10 is disposed long in the front and rear direction X, one of the pair of cam noses 102 and 103 may come into contact with the cam nose contact portion 35 and press the cam nose contact portion 35.

When one of the pair of cam noses 102 and 103 presses the cam nose contact portion 35, the cam 10 is subjected to a reaction force of the cam nose pushing the housing 3, and the cam 10 may be pushed backward together with the rotation shaft 8, as shown in FIG. 9 (b).

If the cam 10 is pushed in the rearward direction, the hinge axis 8, the handle 9, the inner body 7 and the cover guide 6 may be pushed rearward together with the cam 10, and the support bracket 4 may be tilted around the hinge axis 31.

FIG. 10 is a bottom view showing a housing and an inner body according to the present embodiment.

FIG. 10 (a) is a bottom view when the inner body is locked to the housing, and FIG. 10 (b) is a bottom view when the inner body is unlocked from the housing.

A locking portion 36 capable of locking the inner body 7 may be formed in the housing 3. The locking portion 36 may be recessed upward at the lower surface of the housing 3.

A locking projection 73 protruding from the inner body 7 may be inserted into and caught by the locking portion 36 as shown in FIG. 10 (a), and may be locked to the housing 3.

When the support bracket 4 is at a reference angle 81, the locking projection 73 may be inserted into and caught by the locking portion 36 as shown in FIG. 10 (a).

The locking projection 73 protruding from the inner body 7 may be withdrawn from the locking portion 36 as shown in FIG. 10 (b), and may be unlocked from the housing 3.

When the support bracket 4 is tilted from the reference angle 61 toward the tilting angle 82, the locking projection 73 may be pulled out from the locking portion 36 as shown in FIG. 10 (b).

The above description is merely an illustrative explanation of the technical idea of the present disclosure, and various modifications and variations will be possible to those skilled in the art without departing from the essential characteristics of the present disclosure.

Accordingly, the embodiments disclosed in the present disclosure are not intended to limit the technical idea of the present disclosure, but rather to explain it, and the scope of the technical idea of the present disclosure is not limited by these embodiments.

The scope of protection of the present disclosure should be interpreted in accordance with the claims below, and all technical ideas within the equivalent scope should be construed as being comprised in the scope of rights of the present disclosure.

The invention claimed is:

1. A mirror assembly comprising:
a housing;
a support bracket rotatably disposed on the housing and coupled to a mirror; and
a cam module mounted on the support bracket and tilting the support bracket relative to the housing,
wherein the cam module comprises:
a cover guide mounted on the support bracket and having a space formed in the cover guide;
an inner body accommodated in the space and having a mountain and a valley formed on an upper surface of the inner body;
a shaft penetrating the inner body;
a handle connected to a lower portion of the shaft;
a cam connected to an upper portion of the shaft, having a mountain and a valley formed on a lower surface of the cam, and contacting the housing; and
an elastic member accommodated in the space and pressing the inner body in the direction of the cam.

2. The mirror assembly of claim 1, further comprising:
a housing glass; and
a ball shaft supported by the housing glass,
wherein the housing comprises a ball receiving portion in which a ball of the ball shaft is inserted and received, the ball receiving portion is supported by the ball.

3. The mirror assembly of claim 1,
wherein a locking hook caught in the housing protrudes on the support bracket, when the support bracket is tilted at a set angle.

4. The mirror assembly of claim 1,
wherein a locking portion is formed on the housing,
wherein a locking projection that is inserted into and caught by the locking portion is formed on the inner body.

5. The mirror assembly of claim 4,
wherein an avoidance groove that avoids the locking projection is formed on the cover guide.

6. The mirror assembly of claim 4,
when the support bracket is at a reference angle, the locking projection is inserted into the locking portion, and
when the support bracket is tilted at the reference angle, the locking projection is pulled out from the locking portion.

7. The mirror assembly of claim 1,
wherein an inner surface of the cover guide and an outer surface of the inner body are polygonal.

8. The mirror assembly of claim 1,
wherein the handle comprises:
a shaft connection portion to which the lower portion of the shaft is connected;
a horizontal body facing a bottom surface of the mirror; and
a vertical body orthogonal to the horizontal body.

9. The mirror assembly of claim 1,
wherein the cam comprises:
a shaft connection portion to which the shaft is connected; and
a pair of cam noses formed symmetrically with the shaft connection portion interposed between the pair of cam noses.

10. The mirror assembly of claim 1, further comprising;
wherein a restoration spring disposed between one surface of the support bracket and one surface of the housing.

* * * * *